United States Patent [19]

Pindar

[11] Patent Number: 4,935,131

[45] Date of Patent: Jun. 19, 1990

[54] DUAL-FLOW BAND SCREEN CONVERSION APPARATUS

[75] Inventor: Dennis Pindar, Sheffield, Great Britain

[73] Assignee: Greenbank Engineering Group, Ltd., Lancashire, England

[21] Appl. No.: 280,552

[22] Filed: Dec. 6, 1988

[51] Int. Cl.⁵ ............................................. B01D 33/04
[52] U.S. Cl. .................................... 210/160; 210/161; 210/400; 210/401
[58] Field of Search ....................... 162/318, 319, 348; 210/157, 160, 161, 400, 401, 420, 421, 456

[56] References Cited

U.S. PATENT DOCUMENTS

| | | | |
|---|---|---|---|
| 1,095,434 | 5/1914 | Stopp | 210/157 |
| 1,208,655 | 12/1916 | Reynolds | 210/160 |
| 1,486,034 | 3/1924 | Rhudy | 210/157 |
| 1,726,608 | 9/1929 | Brackett | 210/161 |
| 2,996,189 | 8/1961 | Salterback | 210/155 |
| 3,850,804 | 11/1974 | Taylor | 210/155 |
| 4,199,456 | 4/1980 | Cheesman | 210/232 |
| 4,374,736 | 2/1983 | Jackson | 210/925 |
| 4,481,904 | 11/1984 | Fletcher | 119/3 |

FOREIGN PATENT DOCUMENTS

| | | |
|---|---|---|
| 577255 | 6/1924 | France. |
| 2110809 | 5/1972 | France. |

OTHER PUBLICATIONS

Screening Equipment Handbook, by Tom M. Pankratz.

Primary Examiner—W. Gary Jones
Assistant Examiner—Wanda L. Millard
Attorney, Agent, or Firm—Moore & Hansen

[57] ABSTRACT

A band screen conversion apparatus for filtering water comprising a structural frame and a conventional endless loop of screens mounted for movement in a circuitous path defining two vertical generatrices through which the water may flow in a dual-flow configuration. Extending outwardly and forwardly from each side of the structural frame is a curving, gull wing arcuate baffle having a ledge which engages a vertical guide track defined by the side wall of the foundation. An upstream flow deflector plate extends across the width and height of the band screen apparatus, with a plurality of support struts extending outwardly and rearwardly from the front of the flow deflector plate and connected to the front edges of the arcuate baffles via brackets which are similarly engaged within the guide tracks thus transferring the differential loads directly to the well guide tracks and side walls. A pair of directional fins are pivotally mounted at the rear of the band screen apparatus which may be locked in one of several preselected orientations, including a retracted position for installation where the directional fins do not project outwardly from the structural frame.

21 Claims, 7 Drawing Sheets

DUAL-FLOW BAND SCREEN CONVERSION APPARATUS

BACKGROUND OF THE INVENTION

This invention relates generally to traveling water screens for filtering water being supplied from a reservoir through a channel or sluice to a hydroelectric, milling, or similar water abstraction facility, and particularly to a dual-flow band screen conversion apparatus for replacing a through-flow band screen device without modification of the structural foundation of the channel.

In addition to the body of information disclosed in the published patent documents of various countries regarding the subject matter identified above, an adequate technical overview of through-flow and dual-flow band screen filtration devices may be found in the recently published text *Screening Equipment Handbook: For Industrial and Municipal Water and Wastewater Treatment* by Tom M. Pankratz (Technomic Publishing Company, Lancaster, Penna. 1988)(LC 88-50738).

U.S. Pat. No. 1,208,655 to Reynolds represents one of the first references disclosing a traveling water flume-screen of the through-flow type, wherein separate articulated screen sections each have marginal frames secured to endless chains carried over sprocketed wheels so that the screens move through a circuitous, predominantly vertical loop. The traveling screens form two imaginary planes or generatrices which are disposed generally perpendicular to the flow of water through the channel. In the Reynolds '655 device, the water is redirected vertically upward after passing through an opening in the structural foundation between a channel and a chamber surrounding the filtration apparatus, into the forward generatrix at an angle less than perpendicular, downwardly behind the rear generatrix, and through a rear intake conduit As the screens are carried above the surface level of the water, debris collected on the screens may be washed off the screens and into a gutter with a high pressure jet created by spray nozzles located within the interior of the band screen apparatus. A small percentage of that debris may remain on the screens as they pass downwardly along the rear generatrix, and ultimately be dislodged by the higher water pressure created by the normal flow through the submerged screens. Even small quantities of such carry-over debris may prove deleterious to the pumps and water handling equipment within the water abstraction facility.

U.S. Pat. No. 2,996,189 to Salterbach discloses a plurality of normally stationary or immobile through-flow filtration screen assemblies which are slidably received within guide tracks or grooves in the side walls of the structural foundation, the screen assemblies alternately being lifted from the channel to be completely cleaned, either automatically or manually.

U.S. Pat. No. 3,850,804 to Taylor combines the teachings of the previous references to achieve a traveling water screen device with an endless series or band of screens which may be received within metal guides set in the side walls or columns of the foundation of a completely open channel or sluice. The Taylor '804 device permits more convenient installation, repair, and replacement of the entire band screen filtering apparatus.

Figure 2:
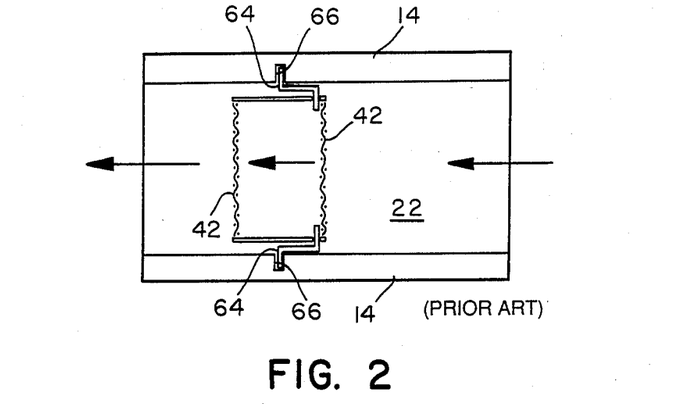
FIG. 2 is a top plan diagrammatic view of a conventional through-flow, band screen apparatus.

A diagrammatic representation of one possible through-flow band screen apparatus is shown in FIG. 2, with the general flow of water shown by directional arrows. It may also be readily appreciated that in addition to the problem of carry-over debris, through-flow band screen devices are subject to other drawbacks. In a deep channel with a substantially unobstructed flow of water, the pressure exerted directly on the screens of a through-flow device will require significant reinforcement of the screens and frame, cause damage to those screens, or result in debris being imbedded in the screens. Having the water pass through two screens additionally creates unnecessary static pressure without enhancing the filtration capabilities of the device.

To eliminate some of the problems associated with through-flow screening devices, dual-flow traveling water screen were developed that require the moving water to flow only through a single screen element while traversing the channel, with any one screen element having water passing through that screen in only one direction over any given period. This may be contrasted with through-flow devices where water passes in one direction through a screen along the front generatrix, and in the reverse direction as the screen travels along the rear generatrix.

Figure 3:
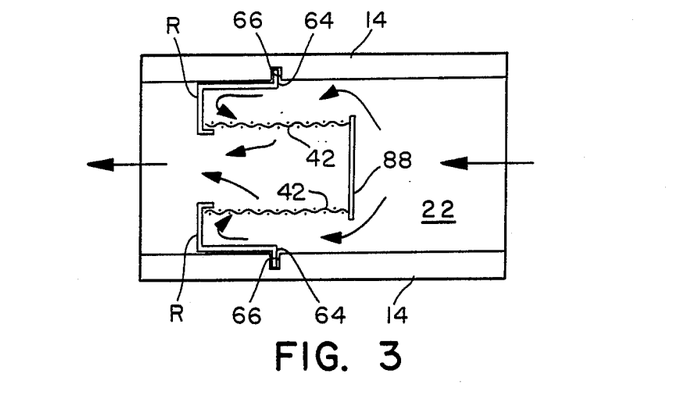
FIG. 3 is a top plan diagrammatic view of a dual-flow band screen conversion apparatus.

Dual-flow travelling water screens may be one of two types:

(a) Double entry/single exit devices where the water passes around the exterior of the band screen apparatus, inwardly through the screens from each opposing side of the apparatus, and outwardly through an exit conduit positioned between the generatrices and communicating with the interior of the band screen apparatus, or (b) Single entry/double exit devices where the water flows through a port between the generatrices and into the interior of the band screen apparatus, exiting through either of the opposing screens. A double entry/single exit band screen conversion device is represented diagrammatically in FIG. 3 with the flow of water shown by arrows. A single entry/double exit device could be represented by the same FIG. 3, but with the direction of the arrows showing the flow of water being reversed from that shown in FIG. 3.

One representative example of early dual-flow band screen devices may be seen in the French Brevet d'Invention No. 577,255 which discloses both types of entry/exit systems, the double entry configuration having angled foundation side walls in the area of the channel proximate to the band screen device, and the single entry configuration appearing to have support for the band screen apparatus from the foundation both at the front and rear corners of the band screen apparatus.

U.S. Pat. No. 1,726,608 to Brackett discloses a self-contained rotary strainer which utilizes dual-flow principles in a more unusual single entry/single exit configuration, with a restricted side outlet conduit. The Brackett '608 device is usable only at low flow volumes, or with high static pressure and a substantially watertight seal between the housing and screen frames.

Double entry dual-flow configurations are generally preferred because they create less static back pressure, however it can be seen from the French '255 patent that the double entry configurations generally require significant structural reinforcement of the band screen main frame or housing to withstand the upstream flow pressure exerted against the submerged front main frame or housing wall, or alternately require that the foundation be specifically constructed to receive the particular band screen apparatus.

While dual-flow band screen devices are more common in European countries, with modern sluices and filtration channels being designed to utilize that technology, the majority of similar facilities in the United States have been or are continuing to be designed to use through-flow technology. Consequently, the ability to convert existing through-flow sluices and channels to dual-flow technology is a concern One dual-flow band screen apparatus, and a method for substituting that apparatus for its through-flow counterpart in existing through-flow channels, is shown in U.S. Pat. No. 4,374,736 to Jackson. The Jackson '736 device comprises a two-part assembly including a rear support wall and a band screen apparatus, such as is shown diagrammatically in FIG. 3 herein. In operation, the channel is dammed and drained, and the rear support wall R is lowered into place and normally installed against a rear foundation wall. The rear support wall engages the guide tracks defined in the side walls of the foundation in which the housing of the through-flow apparatus is normally received, and extends rearwardly parallel to the side walls and then inwardly perpendicular to the side walls. The rear support wall defines an exit port communicating with the outlet or opening in the rear foundation wall against which the rear support wall is fixedly mounted, the majority of the rearward pressure or forces being absorbed by the rear foundation wall rather than the rear support wall. The exit port similarly communicates with the interior of the band screen apparatus between the generatrices once the band screen apparatus is installed and mounted to the rear support wall.

While the Jackson '736 patent does present one solution for situations where a conventional through-flow apparatus is being replaced by a dual-flow apparatus and it is desirable to utilize the existing foundation structure with minimal modification, there are several drawbacks inherent in its design. The Jackson '736 device requires significant expenditures for installation, because the water abstraction facility must be shut down, the channel dammed and drained, and the rear support wall installed prior to installing the band screen apparatus. Once installed, if the band screen device needs repair or replacement the entire operation must be repeated, resulting in additional time and expense.

The Jackson '736 device also requires significant structural reinforcement of the band screen apparatus itself, since the submerged portion of the front wall must withstand the pressure of the upstream flow through the channel. The structural reinforcement must also be capable of preventing lateral or sideways movement or shifting within the channel, particularly since the water flowing around the front housing wall and rebounding against the rear support wall creates swirling turbulence which can generate destructive vibrations in the band screen apparatus. This is a particular concern in deeper channels where the front wall of the band screen apparatus is exposed, since significant water pressure differentials can be created between the surface and the bottom of the channel, and vertical turbulence can result in tremendous lateral pressure on the band screen apparatus. Consequently, a significant amount of cross-bracing and lattice work must be incorporated into the Jackson '736 design while avoiding interference with the operation of the band screen apparatus.

The French Brevet d'Invention No. 2,110,809 discloses a dual-flow water filtering system in which a band screen apparatus is mounted within a generally cylindrical housing having a restricted front inlet and a rear outlet, thereby creating a self-contained, freestanding unit for smaller volume filtering applications where turbulence and pressures are minimal.

BRIEF SUMMARY OF THE INVENTION

It is therefore one object of this invention to design a dual-flow band screen conversion apparatus which may be installed as a unitary assembly in a channel to replace a conventional through-flow apparatus.

It is a related object of this invention to design the above dual-flow band screen conversion apparatus such that it may be installed in the channel and achieve multidirectional support and stabilization employing the existing guide tracks defined in the side walls of the channel which were utilized by the through-flow apparatus.

It is yet another object of this invention to design the above dual-flow band screen conversion apparatus such that at least a substantial portion of the pressure exerted against the upstream face of the submerged portion of the band screen apparatus by the flowing water is transferred to the side walls of the foundation, rather than through the structural frame of the band screen apparatus to the rear wall of the foundation, thereby minimizing the internal structural reinforcement of the band screen apparatus.

It is a related object of this invention to design the above dual-flow band screen conversion apparatus so as to prevent lateral movement of the band screen apparatus within the channel.

It is a distinct object of this invention to design the above dual-flow band screen conversion apparatus to utilize a pair of generally arcuate baffles to control the flow of water into the generatrices of the band screen apparatus, the arcuate baffles similarly engaging the guide tracks defined in the side walls of the foundation.

It is a related object of this invention to design the above dual-flow band screen conversion apparatus such that the arcuate baffles include reinforcing plates which prevent distortion of the baffles and diminish the vertical turbulence in the flowing water as it approaches the generatrices.

Briefly described, the band screen conversion apparatus comprises a structural frame and a conventional endless loop of screens mounted for movement in a circuitous path defining two vertical generatrices through which the water may flow in a dual-flow configuration. Extending outwardly and forwardly from each side of the structural frame is a curving, arcuate baffle having a ledge which engages the vertical guide track defined by the side wall of the foundation. An upstream flow deflector plate extends across the width and height of the band screen apparatus, with a plurality of support struts extending outwardly and rearwardly from the front of the flow deflector plate and being connected to the front edges of the arcuate baffles via brackets which are similarly engaged within the guide tracks. A pair of directional fins are pivotally mounted at the rear of the band screen apparatus which may be locked in one of several preselected orientations, including a retracted position for installation where the directional fins do not project outwardly from the structural frame.

DESCRIPTION OF THE PREFERRED EMBODIMENT

The dual-flow band screen conversion apparatus, herein also referred to as the travelling water screen of this invention, is shown in FIGS. 1-19 and referenced generally therein by the numeral 10. The dual-flow band screen conversion apparatus 10 is intended to be mounted in a substantially submerged position within a channel of water flowing from a reservoir to a pumping system contained within a hydroelectric plant or similar water abstraction facility.

Figure 1:
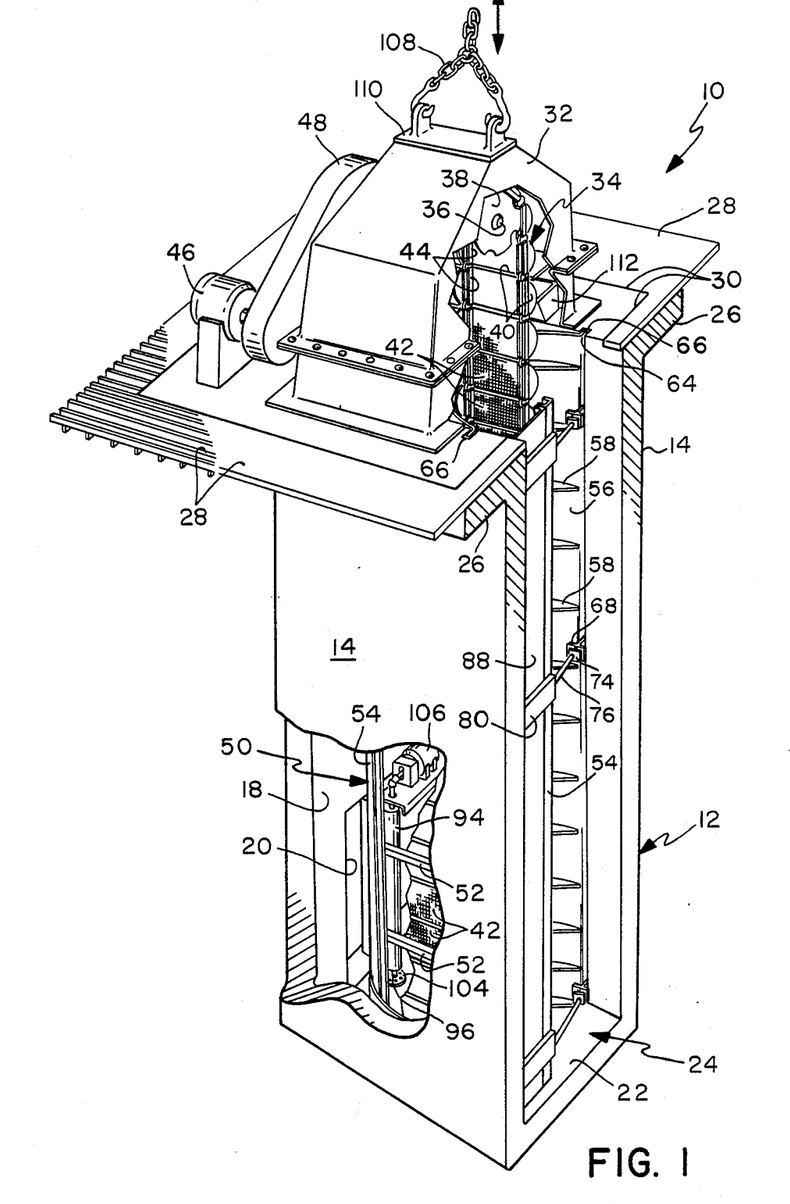
FIG. 1 is a front perspective view of the band screen conversion apparatus of this invention.

Referring particularly to FIG. 1, the dual-flow band screen conversion apparatus 10 is shown mounted within a channel defined by a foundation 12 preferably constructed from poured and pre-stressed concrete, the foundation 12 consisting of a pair of generally vertical opposing side walls 14, a rear wall 18 defining a rear outlet 20, and a floor segment 22. The foundation 12 may optionally include a front wall (not shown) which together with the side walls 14 define a front flow portal 24 or opening directed upstream toward the oncoming flow of water within the channel. The foundation 12 may further include a generally horizontal platform portion 26 disposed at or above the water level and covered with decking material 28 so that personnel from the water abstraction facility may operate near or on the dual-flow band screen conversion apparatus 10, the decking material 28 defining an opening 30 through which the dual-flow band screen conversion apparatus 10 may be lowered into the channel and surrounded or enclosed with additional decking material 28.

Figure 6:
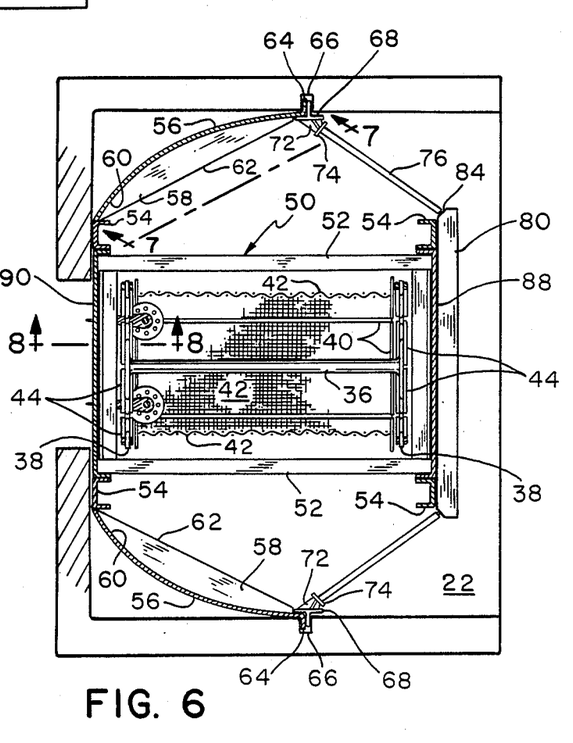
FIG. 6 is a top cross section view of the band screen conversion apparatus of FIG. 1 taken through line 6—6 of FIG. 5.
Figure 7:
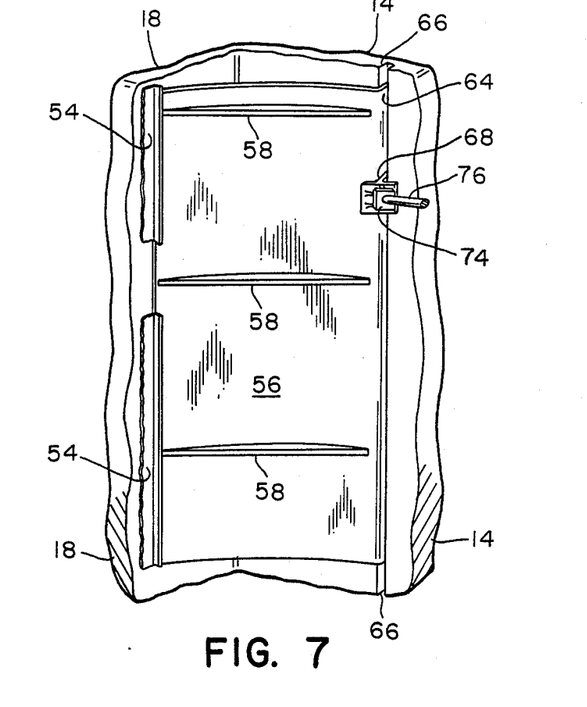
FIG. 7 is a front side elevation view of the arcuate baffles of the band screen conversion apparatus of FIG. 1 taken from line 7—7 of FIG. 6.
Figure 8:
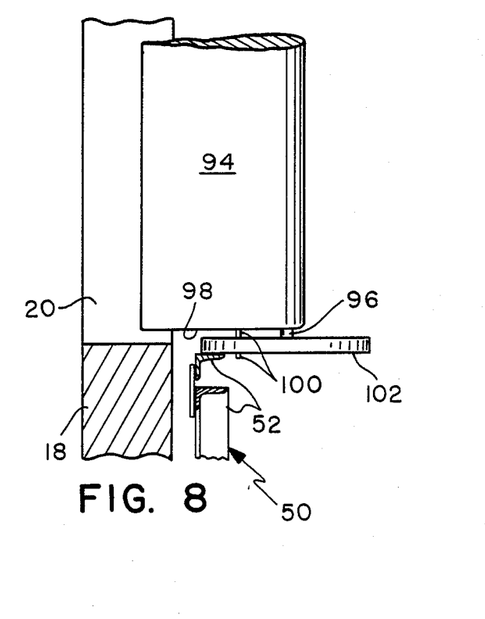
FIG. 8 is a side cross section view of the band screen conversion apparatus of FIG. 1 taken through line 8—8 of FIG. 6 showing the extended rear directional fin in partial side elevation oriented rearwardly.
Figure 9:
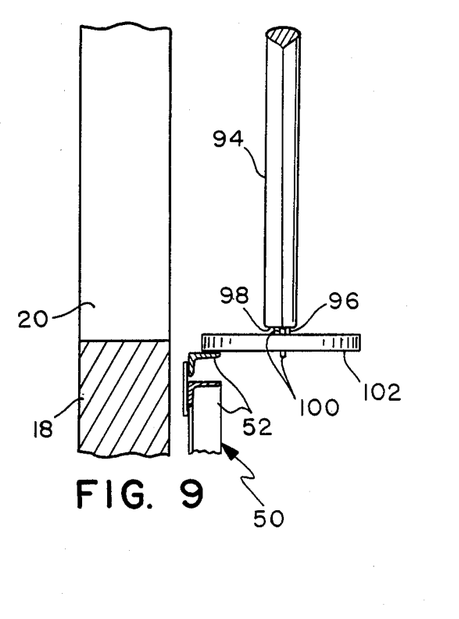
FIG. 9 is a side cross section view of the band screen conversion apparatus of FIG. 1 taken through line 8—8 of FIG. 6 showing the retracted rear directional fin in partial side elevation oriented inwardly.
Figure 10:
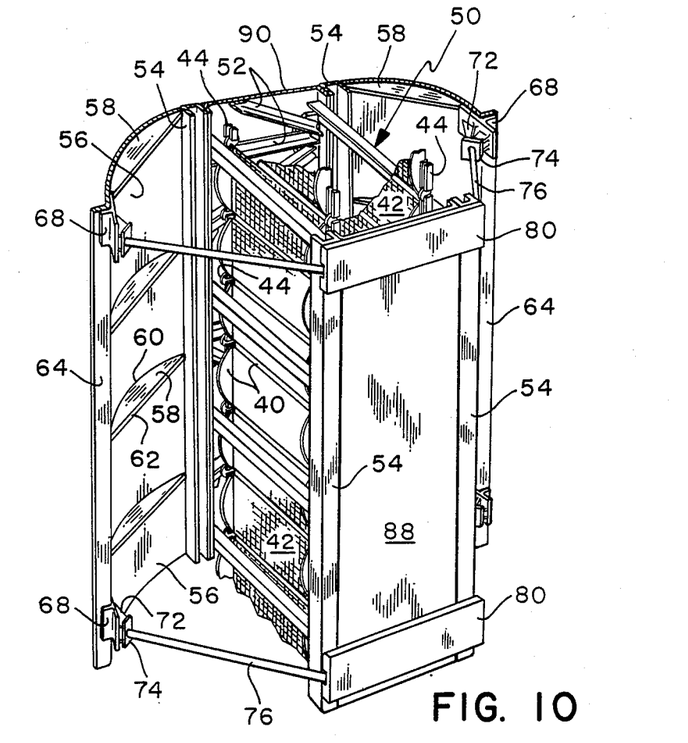
FIG. 10 is a partial front perspective view of the lower section of the dual-flow band screen conversion apparatus of FIG. 1.
Figure 11:
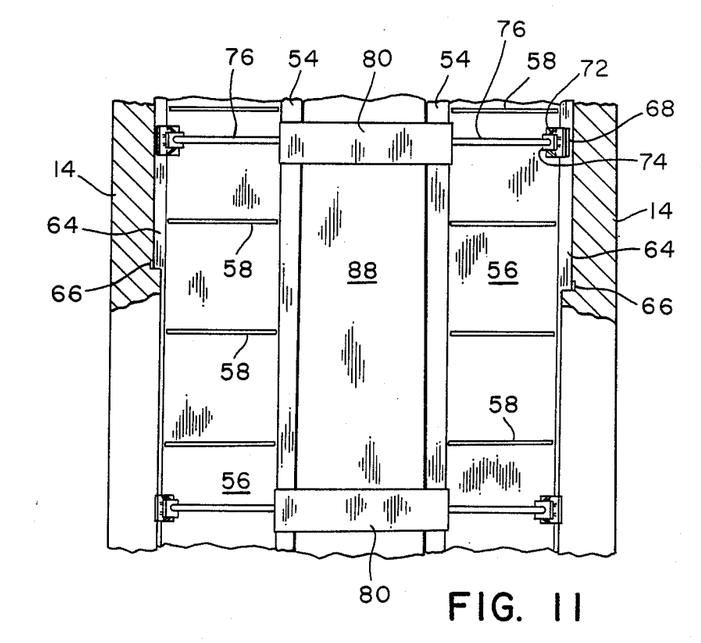
FIG. 11 is a front elevation view of the central section of the dual-flow band screen conversion apparatus of FIG. 1.
Figure 12:
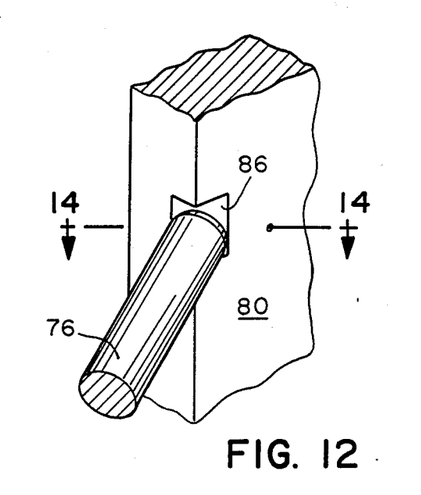
FIG. 12 is a perspective view of a stabilizing support strut connected to the front cross brace.

Referring to FIGS. 1, 6, and 10, the dual-flow band screen conversion apparatus 10 itself is seen to comprise a top housing 32 extending above the decking material 28. The housing contains a band screen assembly 34 of a type well known to the art, the band screen assembly 34 including a generally horizontal top drive shaft 36 or head shaft extending longitudinally generally parallel with the channel and having a pair of drive gears 38 mounted on the ends thereof, each drive gear 38 carrying a plurality of interconnected frames 40 each having a generally planar screen mesh 42 on chain flights 44, each screen mesh 42 permitting water to pass through but restricting the flow of debris or objects having dimensions larger than those of the openings or orifices in the screen mesh 42. In a typical configuration, more than sixty interconnected frames 40 will be utilized, the screen mesh 42 being capable of filtering some 90,000 U.S. gallons per minute at a linear velocity of slightly over 3.0 feet per second when submerged to 4.0 feet below the surface of the water in the channel.

The band screen assembly 34 also includes a lower drive shaft and drive gears (not shown) such that the chain flights 44 and frames 40 are carried generally vertically up and down in a circuitous rotary path, passing upwardly along and parallel with one of the side walls 14 of the foundation 12, and downwardly along and parallel with the opposing one of the side walls 14 of the foundation 12 in an endless loop. The upper drive shaft 36 is propelled by a drive motor 46 connected to the drive shaft 36 using a linkage mechanism 48 such as a chain differential of similar suitable apparatus.

Further contained within the housing 32 and extending downwardly to the floor 22 of the foundation 12 is a structural frame assembly 50 comprising a plurality of lateral cross beam members 52 and a plurality of vertical beam members 54, the cross beam members 52 extending between the vertical beam members 54 in a substantially horizontal orientation parallel with the side walls 14 of the foundation 12, and at acute angles therebetween as necessary to provide structural support in each of three dimensions.

Fastened to each of the outer rear vertical beam members 54 of the structural frame assembly 50 and extending vertically along the entire height of the structural frame assembly 50 are a pair of gull-wing, arcuate baffles 56 which extend outwardly toward the side walls 14 of the foundation 12 and curve continuously forward from the outer rear vertical beam members 54 to a position approximately equidistant to the front and the back of the structural frame assembly 50 closely confronting the opposing side walls 14. The curvature of the arcuate baffles 56 may vary depending upon several factors such as the depth of the channel, the velocity of the water flow, the position and location of the water inlet and outlet, and the characteristics of the screen filtration system.

Figure 13:
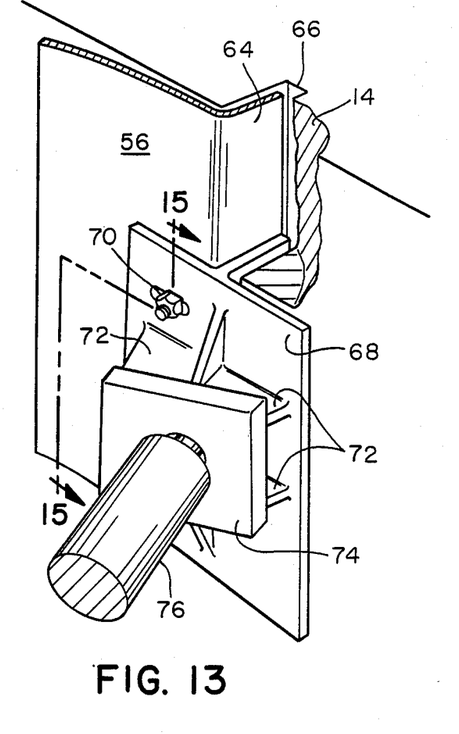
FIG. 13 is a broken perspective view of the stabilizing support strut, side mounting bracket, and projecting ledge of the arcuate baffles of the band screen conversion apparatus of FIG. 1 installed within the guide track of the foundation.
Figure 14:
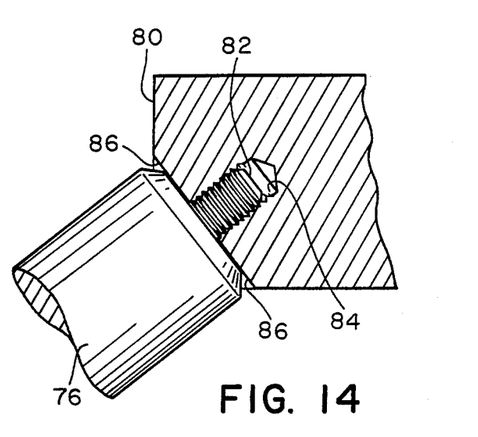
FIG. 14 is a top partial cross section view of the stabilizing support strut and front cross brace of FIG. 12.
Figure 15:
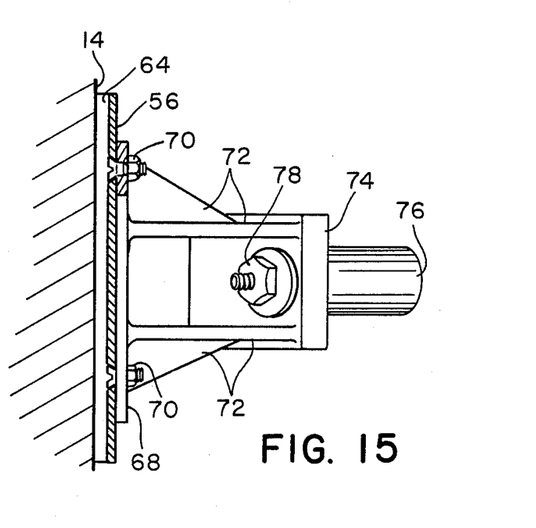
FIG. 15 is a rear elevation view of the stabilizing support strut, side mounting bracket, and projecting ledge of the arcuate baffles of the band screen conversion apparatus of FIG. 1 installed within the guide track of the foundation.
Figure 16:
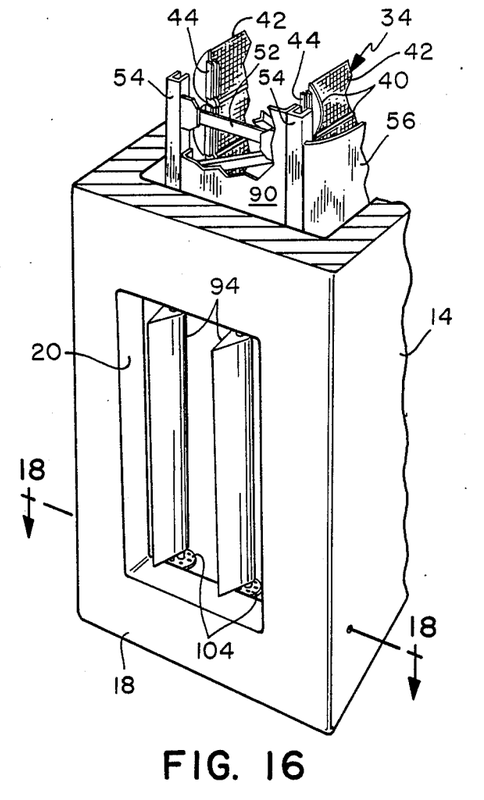
FIG. 16 is a rear perspective view of the dual-flow band screen conversion apparatus of FIG. 1 mounted within the foundation with the rear directional fins extended rearwardly.
Figure 17:
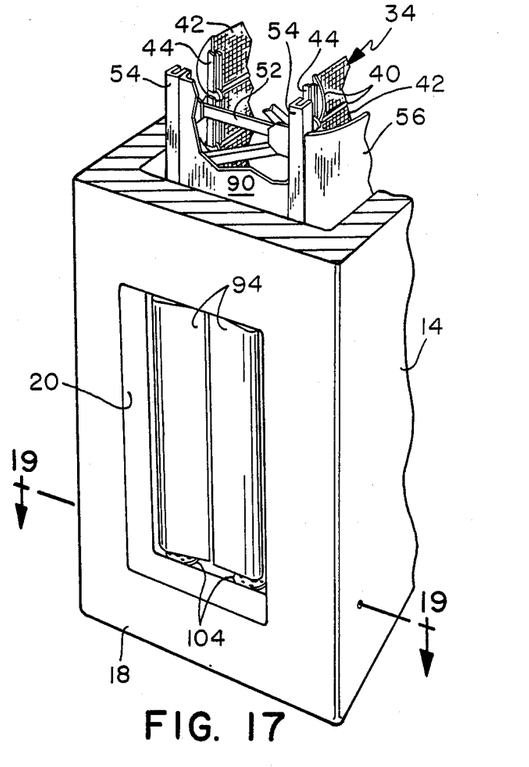
FIG. 17 is a rear perspective view of the dual-flow band screen conversion apparatus of FIG. 1 partially mounted within the foundation with the rear directional fins retracted inwardly.
Figure 18:
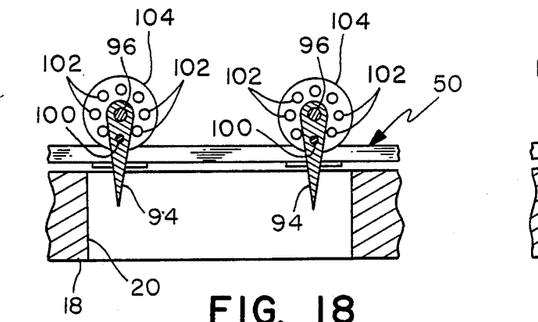
FIG. 18 is a top cross section view of the rear portion of the dual-flow band screen conversion apparatus of FIG. 1 mounted within the foundation with the rear directional fins extended rearwardly.
Figure 19:
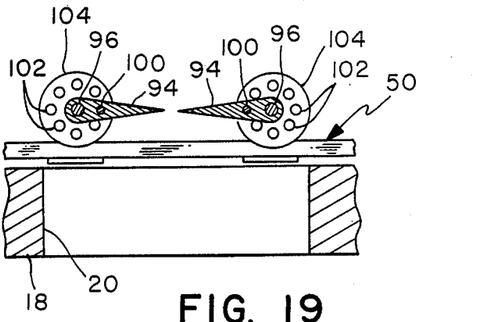
FIG. 19 is a top cross section view of the rear portion of the dual-flow band screen conversion apparatus of FIG. 1 partially mounted within the foundation with the rear directional fins retracted inwardly.

Referring to FIGS. 6, 10, and 13 it may be seen that the form of the arcuate baffles 56 is held constant by a plurality of spaced-apart stiffener plates 58 which are affixed to the generally curved forward surface of the baffles 56 along curved rear edges 60 which follow the curvature of the forward surface of the corresponding baffle 56 to keep the arcuate baffles 56 from distorting significantly against the pressure of the flowing water being diverted into the proximity of the screen mesh 42, and to further direct that water in a generally horizontal path to minimize vertical turbulence and swirling. The stiffener plates 58 extend along a generally straight front edge 62 between the outer rear vertical beam members 54 and the front portion of the arcuate baffles 56.

The front edge of the arcuate baffles 56 form an outwardly projecting vertical ledge member 64 disposed generally perpendicular to and closely confronting the inwardly facing surface of the side walls 14 of the foundation 12. Each projecting ledge 64 is oriented so as to be slidably and engagingly received within a generally vertical recessed guide track 66 defined by and extending into the surface of the side wall 14 of the foundation 12, the recessed guide track 66 being configured to withstand the rearward stresses imparted on the dual-flow band screen conversion apparatus 10 by the flowing water.

Referring particularly to FIGS. 1, 6, 11, 13 and 15, it may be seen that at various points spaced apart along the vertical height of the dual-flow band screen conversion apparatus 10, the arcuate baffles 56 are securely attached to one wing or extension of a T-bracket 68 using conventional fastening means 70. The one extension of the T-bracket 68 is disposed along the inward facing surface of the arcuate baffle 56, while the opposing parallel extension closely confronts and may in some cases be affixed to the inward facing surface of the side wall 14 of the foundation 12. The third perpendicular extension or leg member of the T-bracket 68 is received within the recessed guide track 66 adjacent to and closely confronting the front surface of the projecting ledge 64 generally parallel therewith. The parallel extensions of the T-bracket 68 form an inward face from which projects an angled and reinforced mounting flange 72, the mounting flange designed to withstand compression forces directed toward the inward face of the T-bracket 68 as well as rearward forces generally parallel with the surface of the side wall 14 of the foundation 12. The mounting flange 72 presents an enlarged mounting face 74 disposed at a generally acute angle relative to the inward face of the T-bracket 68 and the surface of the side wall 14 of the foundation 12.

Extending from and connected to each of the mounting faces 74 of the T-brackets 68 is a stabilizing support strut 76, the rear or distal end of the support strut 76 being fastened generally perpendicularly to the mounting faces 74 of the T-brackets 68 with a conventional fastening means 78. Each support strut 76 extends forward and inward from the T-bracket 68 and the side wall 14 of the foundation 12 and is connected one of the opposing ends a transverse brace member 80, the struts 76 having threaded extensions 82 being received within similarly threaded bores 84 within the beveled ends 86 of the transverse brace members 80, or being securely fastened in a suitable alternate manner.

The support struts 76 preferably form an acute angle of between thirty and sixty degrees relative to the side walls 14 of the foundation or the generatrices of the band screen apparatus 34. The number of support struts 76 will vary depending upon the height of the apparatus 10, one representative example being a forty foot tall apparatus 34 measured from the floor 22 to the platform 26 (or conversely a forty foot deep channel) wherein four pair of support struts 76 are used, one pair of the support struts 76 being placed closely adjacent to the bottom of the band screen apparatus 34, a second pair elevated 5-6 feet above the bottom of the band screen apparatus 34, and the third and fourth pairs being spaced upwardly 14-15 feet from the next lowest pair of support struts 76.

The transverse brace members 80 are fixedly attached in a generally horizontal orientation to a flow deflector plate 88 or upstream pressure transducer having an upstream face constructed of one or more thick sheets or plates of metal and which extends horizontally across the width of the front of the structural frame assembly 50 between the opposing sides thereof, and vertically along the height of the structural frame assembly 50, the transverse beam members 80 and flow deflector plate 88 being attached across the front and within the inner sides of the vertical beam members 54 of the structural frame assembly 50. The transverse brace members 80 distribute the rearward forces exerted by the flowing water upon the flow deflector plate 88 outwardly along the stabilizer and support struts 76 to the T-brackets 68, and thereby to the recessed guide tracks 66 within the side walls 14 of the foundation 12. The force exerted linearly along the support struts 76 serve to maintain the engagement of the ledges 64 of the arcuate baffles 56 within the recessed tracks 66 by exerting an outward force against those arcuate baffles 56 via the rearward extension of the T-brackets 68. An opposing rear submerged housing wall 90 attached to and extending across the rear of the structural frame assembly 50 in a manner similar to the flow deflector plate 88 may be utilized to further enclose the band screen assembly 34.

Figure 4:
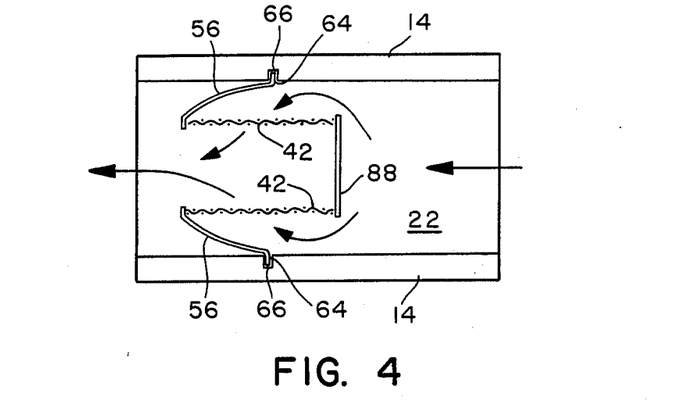
FIG. 4 is a top plan diagrammatic view of the dual-flow band screen conversion apparatus of this invention.
Figure 5:
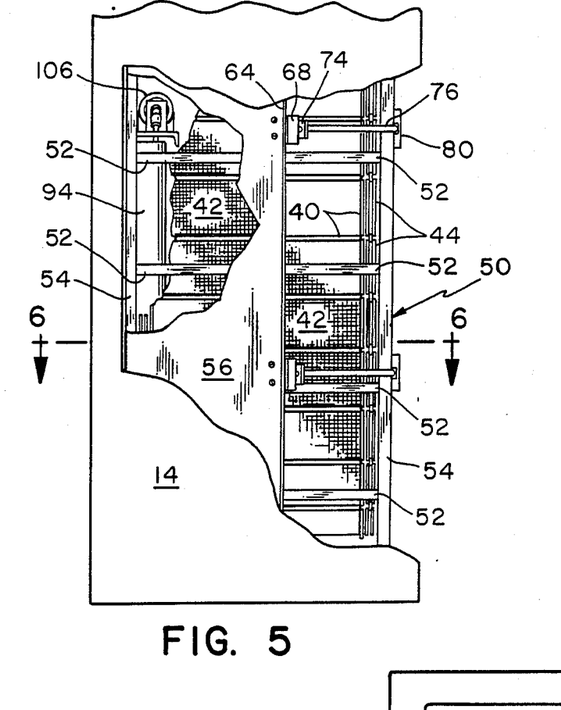
FIG. 5 is a side elevation view of the band screen conversion apparatus of FIG. 1.

As such, water flowing through the channel toward the rear wall 18 of the foundation 12 and toward the band screen assembly 34 as shown in FIG. 4 will be deflected to one side or another by the flow deflector plate 88 or pressure transducer, the water flowing around the exterior of the structural frame assembly 50 and band screen assembly 34 and between the flow deflector plate 88 and rear submerged housing wall 90 which form a substantially water-tight seal with the band screen assembly 34 such that any water must flow through the screen mesh 42 of the interconnected frames 40 of the band screen assembly 34 from either one of the opposing sides of the dual-flow band screen apparatus 10, with the water then flowing from the interior of the band screen assembly 34 and rearwardly through the rear water outlet 20 and into the pumping system of the water abstraction facility.

Referring to FIGS. 8, 9 and 16-19, it may be seen that the rear water outlet 20 of the rear wall 18 fluidly communicates with the interior region of the structural frame assembly 50 situated between the outer rear vertical beam members 54 and generally between the generatrices of the band screen assembly 34. In order to direct the flow of water exiting the rear water outlet 20, the dual-flow band screen conversion apparatus 10 incorporates a pair of rear directional fins 94, each rear directional fin 94 having a generally tear-drop or airfoil shaped horizontal cross section and mounted in generally vertical orientation for pivotal movement about a vertical axle 96, and for slight linear movement in the vertical longitudinally along the axle 96. Depending from the bottom edge 98 of each rear directional fin 94 is a retaining pin 100 which may be received within one of a plurality of spaced apart apertures 102 in a fin locking plate 104 as the rear directional fin 94 is rotated about the main vertical axle 96 and lowered, thereby producing means for engagingly locking the directional fins 94 in a preselected direction of orientation relative to the outlet 20 and structural frame 50. The entire rear directional fin 94 may be lifted upwardly using a jack mechanism 106 located at the upper edge of the rear directional fin 94 and connected to the structural frame assembly 50, and rotated to various positions such as the inwardly directed, fully retracted or closed position shown in FIGS. 17 and 19, or the rearwardly directed, extended position shown in FIGS. 16 and 18, to direct the flow of the water as desired.

In operation, the complete dual-flow band screen conversion apparatus 10 is fabricated or constructed as an integral unit including the band screen assembly 34, the structural frame assembly 50, and arcuate baffles 56. The dimensions of the band screen assembly 34 and structural frame assembly 50 will be dictated generally by the depth of the channel from the platform portion 26 to the floor segment 22, the width between the opposing side walls 14, the depth of the water level, and the rate of flow of the water as it passes through the channel from an upstream reservoir toward the outlet 20.

The exact dimensions, tolerances, positions, and orientations of the arcuate baffles 56, deflector plate 88, support struts 76, stiffener plates 58, and directional fins 94 will depend upon the dimensions of the channel, particularly the width of the channel between the side walls 14, the placement of the guide tracks 66, as well as the depth, consistency, flow rate and volume of the water which is being directed into and through the band screen apparatus 34 for filtering. The nature and type of frames 40 and screen mesh 42 utilized will similarly be a matter of design choice based upon the known tolerances and capacity of the apparatus 10, as well as the potential variety of debris which will be filtered by the band screen apparatus 34.

The dual-flow band screen conversion apparatus 10 is then delivered to the site of the channel at which it is to be installed, with modifications being made to the device on site as may be necessary. The dual-flow band screen conversion apparatus 10 is lifted into position disposed over the channel by a crane or similar lifting mechanism 108 which may be attached to a permanent or removable transport fixture 110 mounted preferably on the upper portion of the housing 32 or structural frame assembly 50.

The dual-flow band screen conversion apparatus 10 is positioned above the channel with the front end thereof facing generally upstream, and with the front ends of the arcuate baffles 56 positioned closely adjacent to the guide tracks 66 in the side walls 14 of the foundation 12. The directional fins 94 are pivoted to a retracted position such that the directional fins 94 do not extend significantly beyond the rear of the structural frame assembly 50, or are retracted sufficiently to clear any obstructions created by the rear wall 18 of the foundation 12 if one is utilized in the particular channel.

The dual-flow band screen conversion apparatus 10 is then controllably lowered into the channel with the projecting vertical ledge members 64 of the arcuate baffles 56 being receivably engaged within the guide tracks 66. In some applications, particularly where an existing through-flow band screen device is initially being replaced, it may be preferable to dam and drain the channel to remove the existing through-flow band screen device and thereby permit adjustments in the support struts 76 to be made to enhance the engagement of the T-brackets 68 and vertical ledges 66 within the guide tracks 66 or to otherwise provide for additional engagement or fastening means from the arcuate baffles 56 to the side walls 14 of the foundation 12. Alternately, such modifications or enhancements could be accomplished remotely or by divers, although it is anticipated that in the majority of situations where an existing through-flow band screen apparatus is being replaced by the dual-flow band screen conversion apparatus 10 of this invention, the known information regarding the existing through-flow band screen apparatus as well as the condition of the channel itself, will permit original fabrication of a suitable dual-flow band screen conversion apparatus 10 which may be installed directly into the channel once the through-flow device is removed, without necessity of evacuating the channel or the use of divers, and without the need for significant modifications.

The bottom of the band screen apparatus 34 may rest directly upon the floor 22 of the foundation 12 within the channel, or the apparatus 10 may alternately be positioned on a weight-bearing structure attached to the bottom of the frame structure 50, such as a pedestal, or to a weight-bearing structure raised from the floor 22 of the foundation 12, such as a concrete slab.

Once installed, the drive motor 46 connected through the linkage mechanism 48 to the upper drive shaft 36 is engaged to rotate the drive shaft 36, thereby rotating the drive gears 38 and carrying the endless loop of interconnected frames 40 and screen meshes 42 in a circuitous loop, the moving segments of mesh 42 defining two generally vertical generatrices through which the water may flow oriented generally parallel with the side walls 14 of the foundation 12 and parallel with the overall linear path of the flow of water within the channel as the water passes from the reservoir to the outlet 20. One of the generatrices will move vertically upward while the opposing generatrix is moving downward, depending upon the direction of rotation of the upper drive shaft 36. As water passes through the screen mesh 42, debris of varying size is filtered out, the debris being carried upwardly or downwardly through the continuous loop along the surface of the screen mesh 42 until it is eventually carried above the surface level of the water, to a point above the platform region 26 and usually within the housing 32 at which a set of high pressure spray nozzles (not shown) located within the band screen assembly and directed outwardly at the inner surfaces of the screen mesh 42 dislodge clinging debris and wash that debris into a sluice trough 112 which carries that debris to a holding tank or other debris removal station.

In the event the dual-flow band screen conversion apparatus 10 must be repaired or replaced, the entire dual-flow band screen conversion apparatus 10 may be removed from the channel by reversing the installation process, and lowering the repaired or a replacement apparatus 10 into the channel after a minimum of shutdown time.

While the preferred embodiment of the above band screen conversion apparatus 10 has been described in detail above with reference to the attached drawing Figures, it is understood that various changes and adaptations may be made in the band screen conversion apparatus 10 without departing from the spirit and scope of the appended claims.

What is claimed is:

1. A traveling water screen of the dual-flow type for installation as a unitary assembly in at least a partially submerged position within a channel of flowing water to filter debris from said water, said channel including a foundation having a pair of opposing side walls between which said water flows in a generally linear path from an upstream reservoir toward an outlet, said traveling water screen comprising:

a band screen apparatus, said band screen apparatus including a structural frame and an endless loop of screens mounted for movement in a generally circuitous path defining two generally vertical generatrices through which the water may flow, the generatrices being spaced apart to form an interior region and being oriented generally parallel with the side walls of the foundation, said structural frame having a front end and a rear end and a pair of opposing sides, said structural frame further having a flow deflector with an upstream face extending between said opposing sides thereof along said front end thereof, said interior of said band screen apparatus communicating with the outlet;

a pair of opposing arcuate baffles, said arcuate baffles having a front edge and a rear edge, each said arcuate baffle being connected to and extending outwardly and forwardly from one of said opposing sides of said structural frame adjacent to said rear end thereof, each said front edge of said arcuate baffle closely confronting and being engagingly connected to one of the opposing side walls of the foundation; and at least one pair of support struts, each said support strut extending from and being connected to said flow deflector along said opposing sides of said structural frame adjacent to said front end thereof, each said support strut extending outwardly and being engagingly connected to one of the opposing side walls of the foundation proximate to said front ends of said arcuate baffles, whereby the water flowing within the channel is diverted laterally by the flow deflector and along the opposing sides of the band screen apparatus and through the generatrices and the outlet such that the screens filter the debris from the flowing water, the flowing water exerting rearward pressure against the front face of the flow deflector which is substantially transferred by the support struts toward the side walls of the foundation, the arcuate baffles preventing the flowing water from passing the band screen apparatus by directing the flowing water through the generatrices.

2. The traveling water screen of claim 1 wherein the support struts extend outwardly and generally rearwardly at an angle from the flow deflector of the structural frame.

3. The traveling water screen of claim 2 wherein the angle is between thirty degrees and sixty degrees formed relative to the corresponding generatrices.

4. The traveling water screen of claim 1 wherein the number of support struts is greater than or equal to six, at least three of the support struts extending from and being connected to each of the opposing sides of the band screen apparatus.

5. The traveling water screen of claim 1 wherein the side walls of the foundation each have an inner surface and each of the side walls define a guide track recessed into said side wall from said inner surface thereof oriented along a generally vertical direction of extent, the front edge of each of the arcuate baffles having at least one outwardly projecting ledge member connected thereto such that said ledge member is generally aligned with and engagingly received within one said guide track.

6. The traveling water screen of claim 5 wherein each of the support struts is connected to one of the arcuate baffles proximate to the front edge thereof.

7. The traveling water screen of claim 6 wherein each of the support struts has a distal end, said distal end being connected to a bracket, said bracket being connected to one of the arcuate baffles proximate to the front edge thereof, said bracket defining a projecting leg member which is engagingly received within one of the guide tracks.

8. The traveling water screen of claim 7 wherein each bracket defines a portion closely confronting and generally parallel to the inner surface of the corresponding side wall of the foundation, and a mounting face disposed at an angle generally perpendicular to the distal end of the support strut.

9. The traveling water screen of claim 1 wherein each of the support struts is connected to one of the arcuate baffles proximate to the front edge thereof.

10. The travelling water screen of claim 1 wherein each of the arcuate baffles has a height and includes a plurality of stiffener plate, each said stiffener plate being connected to one of the arcuate baffles to prevent the arcuate baffles from distorting significantly.

11. The traveling water screen of claim 10 wherein the arcuate baffles each have a generally curved forward surface and each of the stiffener plates is attached to said generally curved forward surface of the corresponding baffle, said stiffener plates each having a generally curved rear edge following said curved forward surface of the corresponding baffle and a generally straight front edge extending between the front edge of the corresponding baffle and the rear edge of the corresponding baffle.

12. The traveling water screen of claim 1 further comprising:

at least one directional fin connected to the structural frame adjacent to the rear end thereof and proximate to the interior of the band screen apparatus and disposed generally between the generatrices thereof, said directional fin directing the flow of water exiting the band screen apparatus through the outlet in the foundation.

13. The traveling water screen of claim 12 wherein the directional fin is mounted for pivotal movement about a generally vertical axis of rotation, the directional fin further comprising:
   means for engagingly locking the directional fin in a preselected direction of orientation relative to the outlet and structural frame.

14. The traveling water screen of claim 13 wherein the directional fin is mounted for movement in the vertical direction parallel with the axis of rotation, and wherein the means for engagingly locking the directional fin in a preselected direction of orientation comprises:
   at least one retaining pin extending from the directional fin; and
   at least one locking plate, said locking plate defining at least one aperture, said aperture being aligned with said retaining pin such that said retaining pin may received through said aperture when the directional fin is moved in the vertical direction to engagingly lock the directional fin in a preselected direction of orientation.

15. The traveling water screen of claim 12 wherein the directional fin is mounted for pivotal movement about an axis of rotation such that the directional fin may be pivoted between an extended position directed rearwardly relative to the structural frame and a retracted position.

16. The traveling water screen of claim 12 wherein the directional fin has a generally tear shaped cross section.

17. A traveling water screen conversion apparatus of the dual-flow type for installation in at least a partially submerged position within a channel of flowing water to filter debris from said water, said channel including a foundation having a pair of opposing side walls between which said water flows in a generally linear path from an upstream reservoir toward an outlet, each said side wall including a guide track, said traveling water screen conversion apparatus comprising:
   a band screen apparatus, said band screen apparatus including a structural frame and an endless loop of screens mounted for movement in a generally circuitous path defining a pair of generatrices through which the water may flow and an interior, the generatrices being oriented generally parallel with the side walls of the foundation, said structural frame having a front end and a rear end and a pair of opposing sides, said structural frame further having a flow deflector plate with an upstream face extending between said opposing sides thereof along said front end thereof, said interior of said band screen apparatus communicating with the outlet;
   at least one pair of support struts, each one of said pair of support struts extending from and being connected to said flow deflector plate along said opposing sides of said structural frame adjacent to said front end thereof, each said support strut extending outwardly and rearwardly from said structural frame and being engagingly connected to one of the guide tracks of one of the opposing side walls of the foundation,
   whereby the water flowing within the channel is diverted laterally by the flow deflector plate and along the sides of the band screen apparatus and through the generatrices and the outlet such that the screens filter the debris from the flowing water, the flowing water exerting differential pressure rearwardly against the front face of the flow deflector plate which is substantially transferred by the support struts toward the side walls of the foundation.

18. The traveling water screen of claim 17 wherein the support struts extend outwardly and generally rearwardly at an angle, said angle being between thirty degrees and sixty degrees formed relative to the corresponding generatrices.

19. The traveling water screen of claim 17 wherein the side walls of the foundation each have an inner surface and each of the guide tracks is defined by and recessed into one of said side walls from said inner surface thereof, each said guide track being oriented along a generally vertical direction of extent, and wherein each of the support struts has a distal end, said distal end being connected to a bracket, said bracket defining a projecting leg member which is engagingly received within one of said guide tracks.

20. The traveling water screen of claim 17 further comprising:
   a pair of opposing baffles, said baffles having a front edge and a rear edge, each said baffle being connected to and extending outwardly and forwardly from one of the opposing sides of the structural frame adjacent to the rear end thereof, each said front edge of said baffle closely confronting and being engagingly connected to one of the opposing side walls of the foundation, the support struts being connected to one of said baffles proximate to said front edge thereof.

21. The traveling water screen of claim 20 wherein the side walls of the foundation each have an inner surface and each of the guide tracks is defined by and recessed into one of the side walls from said inner surface thereof, each said guide track being oriented along a generally vertical direction of extent, the front edge of each of the baffles having at least one outwardly projecting ledge member connected thereto such that said ledge member is generally aligned with and engagingly received within one of the guide tracks.

* * * * *